United States Patent

Kajitori et al.

[11] Patent Number: 5,753,880
[45] Date of Patent: May 19, 1998

[54] METHOD OF AUTOMATICALLY RECOVERING WIRE BREAKAGE IN WIRE ELECTRIC DISCHARGE MACHINE

[75] Inventors: Toyotada Kajitori; Shinji Yoda, both of Oshino-mura, Japan

[73] Assignee: Fanuc Ltd., Yamanashi, Japan

[21] Appl. No.: 765,960

[22] PCT Filed: May 10, 1996

[86] PCT No.: PCT/JP96/01245

§ 371 Date: Jan. 10, 1997

§ 102(e) Date: Jan. 10, 1997

[87] PCT Pub. No.: WO96/35546

PCT Pub. Date: Nov. 14, 1996

[30] Foreign Application Priority Data

May 11, 1995 [JP] Japan .................... 7-135663

[51] Int. Cl.$^6$ ........................................... B23H 7/10
[52] U.S. Cl. ........................................... 219/69.12
[58] Field of Search ............... 219/69.12; 364/474.04

[56] References Cited

U.S. PATENT DOCUMENTS

| | | | |
|---|---|---|---|
| 4,350,864 | 9/1982 | Jänicke et al. | 219/69.12 |
| 4,367,392 | 1/1983 | Girardin | 219/69.12 |
| 5,077,457 | 12/1991 | Onaka et al. | 219/69.12 |
| 5,113,051 | 5/1992 | Sakaue | 219/69.12 |
| 5,603,851 | 2/1997 | Noda et al. | 219/69.12 |

FOREIGN PATENT DOCUMENTS

| | | |
|---|---|---|
| 56-82133 | 7/1981 | Japan . |
| 5-4120 | 1/1993 | Japan . |
| 6-476269 | 2/1994 | Japan . |

Primary Examiner—Geoffrey S. Evans
Attorney, Agent, or Firm—Staas & Halsey

[57] ABSTRACT

A method of recovering a wire breakage in a wire electric discharge machine in which a wire is automatically connected through a machining groove near a wire breakage position to reduce a time from the wire breakage to the restarting of the electric discharge machining. After detecting the wire breakage, the wire is automatically connected at an intermediate position between the wire breakage position and a start point of a machining block in which the wire breakage occurred under the conditions that the machining block is of a straight-line command or of a circular-arc command having a radius larger than a set radius r0 and a length D between the wire breakage position and a start point of the machining block is equal to or larger than a set length D0. If the above conditions are not satisfied and if a machining block immediately preceding the machining block in which the wire breakage occurred satisfies the above conditions, the wire is automatically connected at an intermediate position between the start and end points of the immediately preceding machining block. If the immediately preceding machining block does not satisfy the above conditions, the wire is automatically connected at a position of a machining start hole.

4 Claims, 4 Drawing Sheets

METHOD OF AUTOMATICALLY RECOVERING WIRE BREAKAGE IN WIRE ELECTRIC DISCHARGE MACHINE

TECHNICAL FIELD

The present invention relates to a method of automatically recovering a wire breakage in a wire electric discharge machine having an automatic wire connecting function.

BACKGROUND ART

When a wire breaks in a machining area during a wire electric discharge machining, it is necessary to reconnect the wire. For this purpose, a portion of an upstream side of the wire is cut off and a workpiece is moved to a position where a machining start hole of the workpiece is in confronting relation to upper and lower guides and then the automatically wire connection is performed by inserting the wire into the machining start hole again. After the wire is reconnected, the wire is moved to retrace a machining path to the position at which the wire broke based on the machining program, whereupon the electric discharge machining is restarted.

In this conventional method, it is inevitable to take a considerable time to restart the electric discharge machining after the wire breakage.

DISCLOSURE OF INVENTION

It is an object of the present invention to provide a wire breakage recovering method capable of reducing a time from the wire breakage to the restarting of the electric discharge machining by performing the automatic wire connection near a position at which the wire broke.

According to a first aspect of the present invention, a method of recovering a wire breakage comprises the steps of: annealing a portion of the wire, upstream of a position of the wire breakage and fusing an end of the annealed wire portion by an annealing/fusing device, and removing the portion of the wire exhausted by an electric discharge machining and separated by the fusing, when the wire is broken in the electric discharging machining; discriminating whether a machining block in which the wire breakage occurred is of a straight-line command or of a circular-arc command; discriminating whether or not the machining block is of a circular-arc command having a radius equal to or larger than a set radius, if it is discriminated that the machining block is of a circular-arc command; discriminating whether or not a length of movement of the wire on a machining path between a start point of the machining block and the wire breakage position is equal or larger than a set value, if it is discriminated that the machining block is of a straight-line command or of a circular-arc command having a radius equal or larger than the set radius; automatically connecting the wire at an intermediate position on the machining path between the start point of the machining block and the wire breakage position while spouting the machining fluid from the nozzle to restrict the wire, if it is discriminated that the length of movement of the wire on the machining path between the start point of the machining, block and the wire breakage position is equal to or larger than the set value; discriminating whether a machining block immediately preceding the machining block is of a straight-line command or of a circular-arc command, if it is discriminated that the machining block in which the wire breakage-occurred is of a circular-arc command having a radius smaller than the set value or if it is discriminated that the length of movement of the wire on the machining path between the start point of the machining block and the wire breakage position is smaller than the set value; discriminating whether or not the immediately preceding machining block is of a circular-arc command having a radius larger than the set radius, if it is discriminated that the immediately preceding machining block is of a circular-arc command; discriminating whether or not a length of movement of the wire on a machining path between start and end points of the immediately preceding machining block is equal to or larger than the set value, if it is discriminated that the immediately preceding machining block is of a straight-line command or if it is discriminated that the immediately preceding machining block is of a circular-arc command having a radius larger than the set radius; automatically connecting the wire at an intermediate position on the machining path between the start and end points of the immediately preceding machining block while spouting the machining fluid from the nozzle to restrict the wire, if it is discriminated that the length of movement of the wire on the machining path between the start and end points of the immediately preceding machining block is equal to or larger than the set value; and automatically connecting the wire at a position of a machining start hole, if it is discriminated that the immediately preceding machining block is of a circular-arc command having a radius smaller than the set radius or if it is discriminated that the length of movement of the wire on the machining path between the start and end points of the immediately preceding machining block is smaller than the set value.

According to a second aspect of the invention, a method of automatically recovering a wire breakage comprises the steps of tracing back a machining program to find a machining block of a straight-line command or of a circular-arc command having a radius larger than the set radius and in which the distance between the start and end points of the machining block is larger than the set value, if it is discriminated that the machining block in which the wire breakage occurred is of a circular-arc command having a radius smaller than a set value or if it is discriminated that the length of movement of the wire on the machining path between the start point of the machining block and the wire breakage position is smaller than a set value; automatically connecting the wire at an intermediate position on the machining path between the start and end points of the machining block found while spouting the machining fluid from the nozzle to restrict the wire; and automatically connecting the wire at a position of a machining start hole if there is not found any machining block of a straight-line command or of a circular-arc command having a radius larger than the set radius and in which the distance between the start and endpoints of the machining block is equal to or larger than the set value.

Since the automatic wire connection is performed by restricting a direction of the wire by the machining fluid flow spouting from the nozzle of the upper guide, it is necessary to guide the wire straightly by the machining fluid flow so that the wire reaches a dice of the lower guide through the workpiece. For this purpose, it is necessary to perform the automatic wire connection at a position where the machining fluid flow is not disturbed so that the wire can be guided to the lower guide. The automatic wire connection can be performed stably at the position of a machining start hole since the machining start hole has a size large enough to pass the wire to the lower guide by the machining fluid flow. However, it takes a considerable time to restart the electric discharge machining after the wire breakage. If the automatic wire connection can be performed at a position of the wire breakage, a time period necessary for recovering the wire breakage is reduced. However, as the machining groove extends in only one direction at the wire breakage position, it is impossible to obtain a machining fluid flow which can restrict the wire to guide it to the lower guide, if the machining fluid is spouted from the nozzle of the upper guide at the wire breakage position. Accordingly, in the present invention, the wire is made straight by annealing the wire with heat generated by an electric current flowing in the wire when fusing an end of the wire, and the end of the wire is formed to have a smooth hemispheric shape for by the fusing of the wire to make it easy to straightly insert the wire through the workpiece. Thus, the automatic wire connection can be performed even in a middle of the machining groove at a position where the machining fluid flow can guide the wire to the lower guide by restricting the wire.

In the case where the machining groove is of a circular arc having a radius smaller than a set value, it is difficult to obtain a machining fluid flow which can restrict and guide the wire, and in the case where a length of the machining groove is short even if it is straight, it is difficult to obtain a machining fluid flow which can restrict and guide the wire. If the machining block in which the wire breakage has occurred is of a circular-arc command having a radius equal to or larger than the set radius or of a straight-line command and if the length between the wire breakage position and the start point of the machining block in which the wire breakage has occurred is equal to or larger than a set value, it is possible to obtain a machining fluid flow which can restrict and guide the wire when the automatic wire connection is performed at an intermediate position between the wire breakage position and the start point of the machining block in which the wire breakage has occurred. Therefore, an automatic wire connection is performed at this intermediate position. If the foregoing conditions are not satisfied, it is discriminated whether or not the automatic wire, connection can be performed at an intermediate position between the start and end point of a machining block immediately preceding the machining block in which the wire breakage has occurred. If the immediately preceding machining block is of a circular-arc command having a radius equal to or larger than the set value or of a straight-line command and the length between the start and end points of the last previous machining block is larger than the set value, the automatic wire connection is performed at the intermediate position between the start and end points of the immediately preceding machining block. If the immediately preceding block does not satisfy the foregoing conditions, the automatic wire connection is performed at the position of the machining start hole. Alternatively, the machining blocks are traced back one by one until a machining block satisfying the foregoing conditions is found, and the automatic wire connection is performed at an intermediate position, between the start and end points of the machining block satisfying the conditions. If none of the machining blocks satisfies the conditions, the wire is automatically connected at the position of the machining start hole.

BEST MODE FOR CARRYING OUT THE INVENTION

Figure 1:
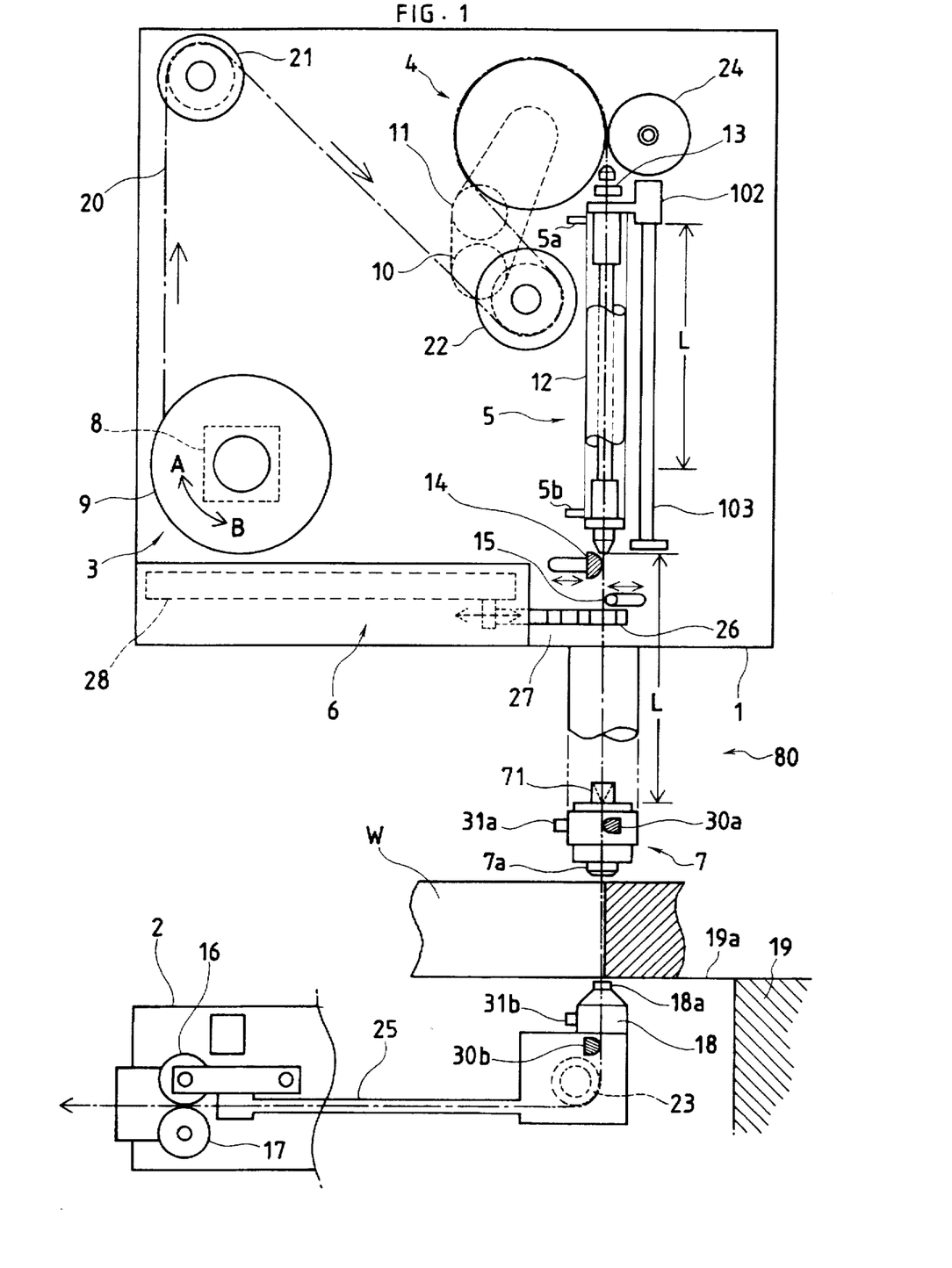
FIG. 1 is a schematic diagram showing a wire electric discharge machine for carrying out the method of the present invention.

As shown in FIG. 1, a wire electric discharge machine 80 has upper and lower machine frames 1 and 2 disposed in confronting relation to each other. The upper and lower machine frames 1 and 2 are arranged vertically movable relative to each other along a non-illustrated column, and a distance between an upper guide 7 at an upstream position in a wire feeding path, and a lower guide 18 at a downstream position in the wire feeding path is adjustable.

A wire supplying/winding unit 3, a brake roller 4, an annealing/fusing device 5, a wire retracting unit 6 and the upper guide 7 are mounted on the upper machine frame 1.

The wire supplying/winding unit 3 is equipped with a supply reel 9 operatively connected to a winding-up motor 8 so that a wire wound on the supply reel 9 is fed to an electric discharge machining area and is wound up by the winding-up motor 8. The brake roller 4 is driven by a braking motor 10, which rotates normally and reversely, via a timing belt, a powder clutch, etc. A pulse coder 11 detects an amount of rotation of the brake roller 4 (i.e. an amount of movement of the wire).

The annealing/fusing device 5 comprises a wire forwarding pipe mechanism 12 disposed upwardly of the upper guide 7, a first wire-fusing electrode 13 disposed in the vicinity of a wire inlet of the wire forwarding pipe mechanism 12, a second wire-fusing electrode 14 which is disposed in the vicinity of a wire outlet of the wire forwarding pipe mechanism 12 and also functions as a wire-end detector, and a pressure roller 15.

The second wire-fusing electrode 14 and the pressure roller 15 are movable toward and away from the wire path. Thus, the second wire-fusing electrode 14 and the pressure roller 15 are driven by a non-illustrated solenoid to move into the wire path in an elongated hole when fusing the wire or detecting an end of the wire, and move away from the wire 20 when performing the electric discharge machining.

In this embodiment, an electric current is supplied to flow in the wire between the first wire-fusing electrode 13 and the second wire-fusing electrode 14 to heat the wire 20 while supplying a cooling air between an air inlet 5a and an air outlet 5b of the wire forwarding pipe mechanism 12. The wire 20 is annealed by heating and at the same time the temperature of the wire 20 increases sharply in the vicinity of the second fusing electrode 14 where no cooling air flows with respect to a section where the cooling air flows, to fuse the wire 20 at a position in the vicinity of the second fusing electrode 14.

The wire retracting unit 6 is composed of an arm 27 having a clamp 26 on its distal end, and an air cylinder 28 for moving the arm 27 back and forth, the clamp 26 being disposed downstream of the pressure roller 15. The section of the wire separated from the downstream wire at the breaking position and also separated from the upstream wire by the annealing/fusing device 5 is gripped by the clamp 26 and 15 retracting a the wire path by a retracting action (from the right-hand to the left-hand in the figure) of the wire retracting unit 6 to be removed out of the upper machine frame 1 by reopening the clamp 26.

In the above manner, the wire is fused at the position upstream of the breaking position and the upstream wire section exhausted by the electric discharge machining and having a rough surface is removed. Thus, the wire 20 is prepared to be smoothly inserted through the machining groove or the machining start hole of the workpiece, and the upper and lower guides 7, 18 in the wire automatic connecting process.

In the upper guide 7, an upper electrode 30a for machining is disposed to face the wire path.

On the lower machine frame 2, a wire drawing roller 17, a pinch roller 16 arranged in confronting relation to the wire drawing roller 17, and the lower guide 18 are mounted. A workpiece W is mounted on a table surface 19a of a table 19 of the wire electric discharge machine 80. A lower electrode 30b for machining is disposed to face the wire path in the lower guide 18. A machining fluid is poured into the upper guide 7 from an inlet 31a and into the lower guide 18 from an inlet 31b to spout toward a machining area as a jet from nozzles 7a and 18a, respectively.

The wire drawn from the supply reel 9 is wound on guide rollers 21 and 22, and guided to a contact point of the brake roller 4 and a pinch roller 24 to extend through the wire forwarding pipe mechanism 12 via the first fusing electrode 13, to reach the upper guide 7. Further, the wire extends through the lower guide 18, and changes its direction on a guide roller 23 to reach the wire drawing roller 17, thus defining the wire path. The wire 20 moves along the wire path by a pulling operation of the wire drawing roller 17 while a predetermined backward tension is given to the wire 20 by the brake roller 4 driven by the braking motor 10 which is controlled by a constant current circuit. The lower machining electrode 30b, which is disposed in the lower guide 18, as well as the upper machining electrode 30a is in contact with the running wire 20 to supply a machining electric power to the wire 20.

When the wire is normally running (in the electric discharge machining), the supply reel 9 idly rotates in the direction of the arrow A. At that time, the clamp 26 is in an open position and not in contact with the wire 20.

The pinch roller 24 comes into contact with a circumferential surface of the brake roller 4 to ensure the contact of the wire 20 with the brake roller 4. A guide pipe 25, in which the wire 20 extends, is disposed between the guide roller 23 and the wire drawing roller of the lower machine frame 2.

The wire forwarding pipe mechanism 12 is electrically insulated from the wire 20 and this mechanism as well as the first fusing electrode 13 is supported by a slide member 102. The slide member 102 is vertically movable along a post guide 103 by a non-illustrated drive means (through a length L) between the illustrated uppermost position and a positioning portion 71 provided in the upper guide 7.

Figure 2:
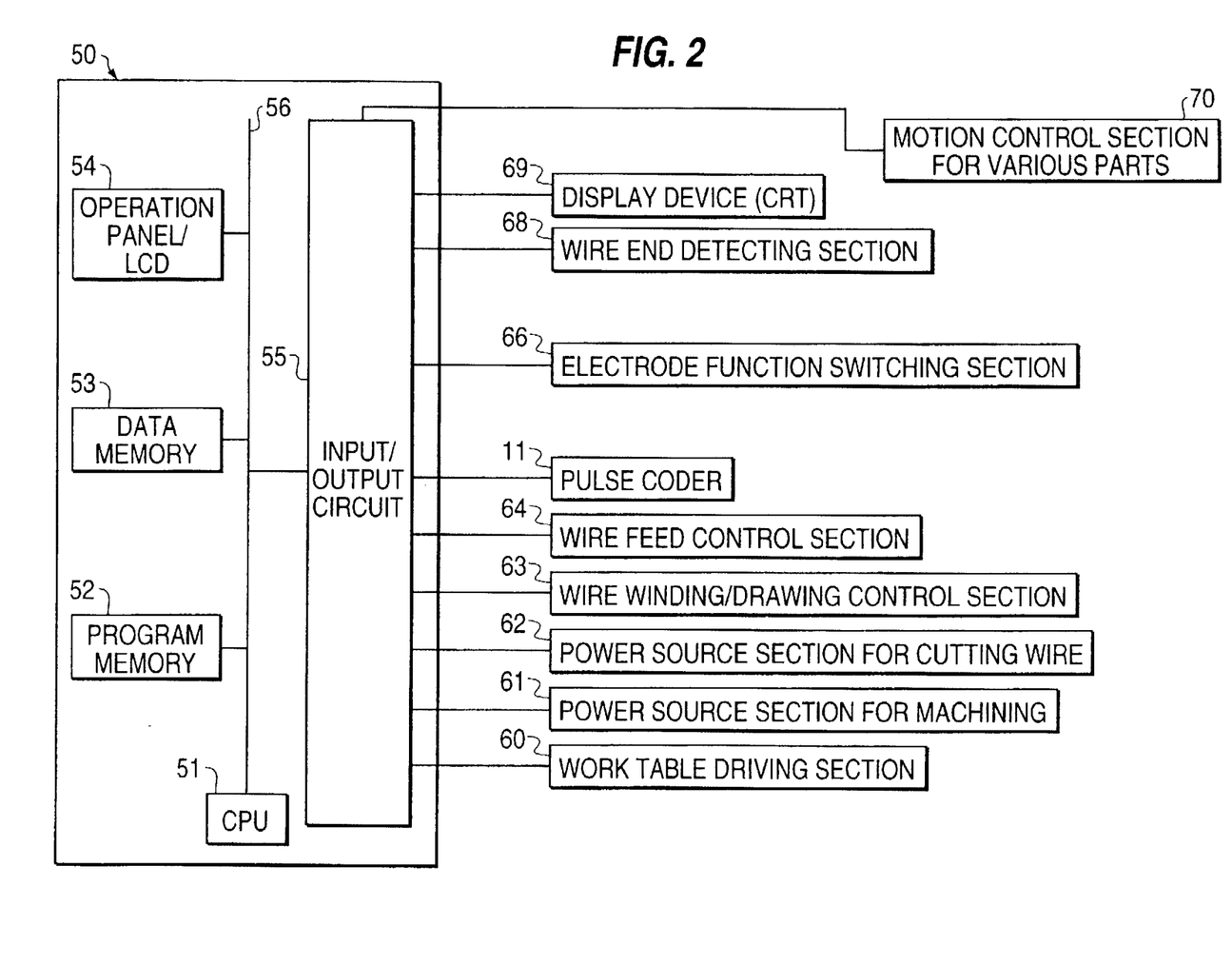
FIG. 2 is a functional block diagram showing a control system of the wire electric discharge machine shown in FIG. 1.

FIG. 2 shows a control system 50 for controlling the electric discharge machine, which also serves as a NC (numerical control) device for controlling the position of the table 19. The control system 50 comprises a central processing unit (CPU) 51 in, the form of a microprocessor, to which a program memory 52, a data memory 53, a control panel 54 with a liquid crystal display LCD, and an input-output device 55 are connected via a bus 56.

In the program memory 52, various kinds of programs for controlling various parts of the wire electric discharge machine 80 and the control system 50 itself are stored. In the data memory 53, position data associated with a machining program and various other set data for defining machining conditions are stored. The data memory 52 is also used as a memory for temporarily storage of data for various kinds of calculations executed by the CPU 51.

To the input-output device 55, a table driving section 60, a machining power source 61, a wire fusing power source 62, a wire winding/drawing control section 63, a wire feed control section 64, the pulse coder 11, an electrode function switching section 66, a wire end detecting section 68, a display device (CRT) 69 and a movement control section 70 for controlling various parts of the wire electric discharge machine 80 are connected.

The table driving section 60 and the machining power source 61 are of well known arrangements and are respectively controlled in the conventional manner when an electric discharge machining is performed. The wire fusing power source 62 supplies necessary electric power to the first and second fusing electrodes 13, 14. The wire winding/drawing control section 63 controls a motor (not shown) for driving the wire drawing roller 17 and the wire winding motor 8.

The wire feed control section 64 is for drivingly controlling the motor 10 for driving the brake roller 4 and the amount of rotation of the brake roller 4 is detected by the pulse coder 11, as mentioned above.

The electrode function switching section 66 chooses functions of the electrode 14 and switches it into one of a function as the second wire-fusing electrode 14 (wire fusing means) and a function as the wire end detecting means 14a. A wire end detection signal from the electrode 14 as the wire end detecting means is inputted to the wire end detecting section 68.

The movement control section 70 for various parts represents control sections for controlling the advance and retreat motion of the second fusing electrode 14 and the lowering motion of the wire forwarding pipe mechanism in automatic connection of the wire.

Figure 3:
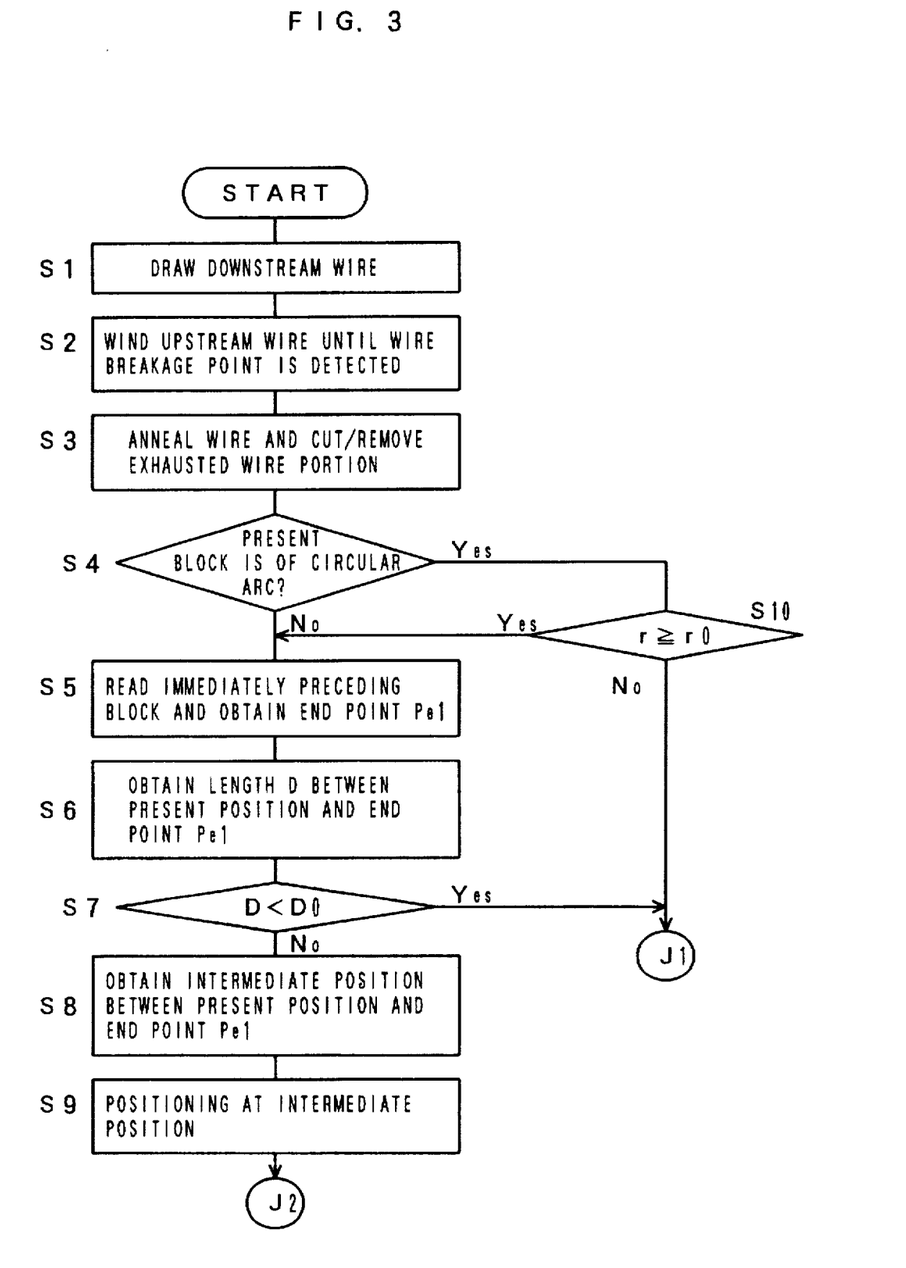
FIG. 3 is a part of a flowchart of a wire breakage recovering process according to the present invention.
Figure 4:
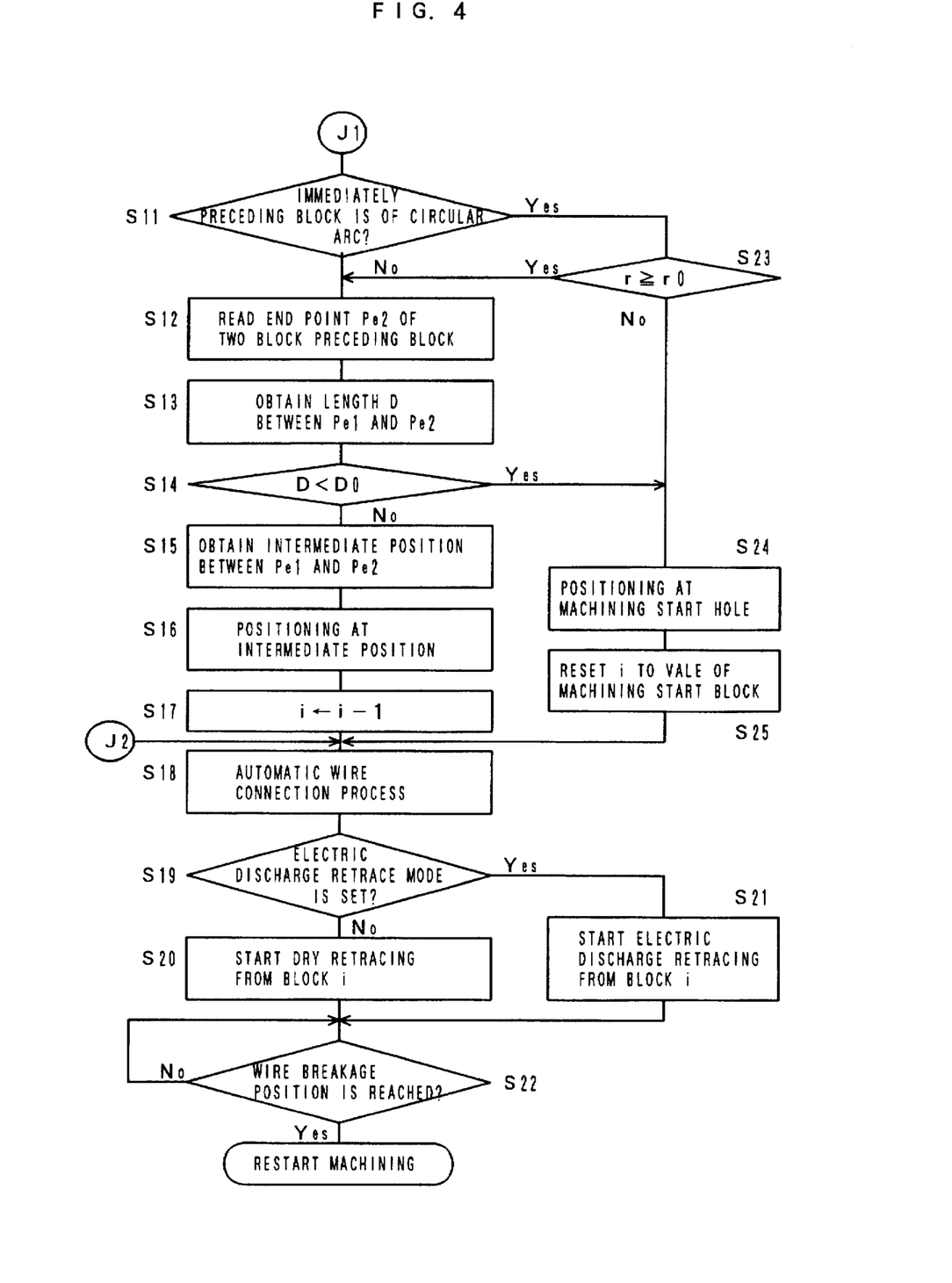
FIG. 4 is a continuation part of the flowchart of FIG. 3.

The CPU 51 observes feedback pulses outputted from the pulse coder 11 when the wire is moving in a normal condition (in the electric discharge machining), and if no feedback pulse is observed for a predetermined time, the CPU 51 judges that the rotation of the brake roller 4 with the wire feed is stopped as the breakage of the wire 20 has occurred in the electric discharge machining area between the upper and lower guides 7 and 18, and starts a wire breakage recovering process as shown in FIGS. 3 and 4.

Upon detection of occurrence of the wire breakage, the CPU 51 outputs a stop command to the table driving section 60, the machining power source 61 and the wire winding/drawing control section 63 to stop driving of the individual axes, power supply between the machining electrodes 30a, 30b and the workpiece, and driving of the wire drawing roller 17, and then drives the wire drawing roller 17 for a predetermined time to draw the wire portion downstream of the broken point (Step S1). Then the CPU 51 resets the value of a counter for adding up feedback pulses from the pulse coder 11, switches over the function of the second fusing electrode 14 into the function of wire end detection, and then outputs a drive command to the wire winding/drawing control section 63 to rotate the supply reel 9 in the direction of the arrow B thus starting a winding operation of the wire 20. The supply reel 9 is rotated until a wire-end detection signal is inputted, i.e. an end of the broken wire 20 is pulled back too a position of the wire fusing electrode 14 (Step S2).

Then, a portion of the wire, which is exhausted by the electric discharge, is removed based on an amount of winding back of the wire 20, which is known from the value of the pulse adding-up counter, and various set data. Thus, a drive command is outputted to the motion control section 70 for various parts so as to actuate the air cylinder 28 to move the clamp 26, which has stayed at a retracted position for the machining, to an operative position as shown in FIG. 1, and the brake roller 4 is drivingly controlled to feed the wire 20 toward the machining area by a predetermined amount based on the feedback signal from the pulse coder, and the clamp 26 is closed to grip the wire 20. Subsequently, the CPU 51 switches the function of the second fusing electrode 14 to the function of wire fusing, turns on the wire fusing power source 62, allows cooling air to flow between the air inlet 5a and the air outlet 5b of the wire forwarding pipe mechanism 12, allows an electric current to flow between the first and second fusing electrodes 13 and 14 so as to anneal the wire 20 as well as fuse the wire 20 at a position between the second fusing electrode 14 and the air outlet 5b. Further, the CPU 51 actuates the air cylinder 28 again to move the clap 26, which is gripping the cut wire 20, to the retracted position at which the clamp 26 is opened to drop the cut wire 20. The processes of Steps S2 and S3 are repeatedly executed as occasion demands and thus the portion of the wire, which has been exhausted by the electric discharge machining, is removed (the processes of the above Steps S1–S3 are described in detail in Japanese Patent Application No. Hei 7-52096).

Then, the CPU 51 reads a block of the machining program, which was in execution when the wire breakage occurred, on the basis of a value of a pointer for indicating a block in execution, and discriminates whether or not the read block is of a circular-arc command (Step S4). If the read block is of a straight-line command, the processing proceeds to Step S5, and if the read block is of a circular-arc command, the processing proceeds to Step 5 in which the CPU 51 discriminates whether or not the radius r of the circular-arc command is equal to or larger than the set value r0 (approximately 50 mm according to the experiments) (Step S10). If the radius r of the circular-arc command is equal to or larger than the set value r0, the processing proceeds to Step S5. Thus, if the machining block at the time of wire breakage is of a straight-line command or of a circular-arc command whose radius r is equal to or larger than the set value r0, the processing proceeds to Step S5. In Step S5, the CPU 51 reads an end point Pe1 of a motion command of a previous block (corresponding to a value smaller than the present value of the pointer by one), one block preceding the block in which the wire breakage occurred, that is a start point Pe1 of the block in which the wire breakage occurred, and then CPU 51 obtains a length D of movement of the wire between the position at which the wire breakage occurred (the present position) and the start point Pe1 of the block in which the wire breakage occurred (Steps S5, S6). The CPU 51 compares the obtained length D and a set length D0 (approximately 10 mm according to experiments) (Step S7) and if the length D is equal to or larger than the set value D0, the CPU 51 determines an intermediate point on the machining path between the breakage point and the start point Pe1 of the block in which the wire breakage occurred. The intermediate point may be set as a central point of the machining path between the breakage point and the start point Pe1 of the block in which the wire breakage occurred. Then, the CPU 51 drives the working table driving section 60 to position the table at the intermediate point (Steps S8, S9) and starts the automatic wire connecting process (Step S18).

In the automatic wire connecting process, the wire 20 is inserted into the lower guide 18 through the machining groove or the machining start hole of the workpiece as being restricted by the machining fluid spouted from the nozzle 7a of the upper guide 7, as described later. Therefore, it is necessary that the machining fluid flow guides the wire 20 to the lower guide 18 without being disturbed in the machining groove or the machining start hole.

For this purpose, it is preferable that a uniform condition is present for the machining fluid flow around the wire being inserted at the wire connecting position. Since a machining groove has not been completed and therefore three sides around the wire is covered by the cut surface of the workpiece W at the wire-breakage position the uniform condition is not present. If the machining fluid is spouted from the upper nozzle at the wire-breakage position, the machining fluid flow is disturbed to make it difficult to insert the wire 20 into the lower guide 18. Also, in a case where the machining block in which the wire breakage occurred is of a circular-arc command and the radius of the circular arc command is smaller than the set value r0, the machining fluid flow in the machining groove is disturbed and hence is not uniform to make it difficult to insert the wire 20 into the lower guide 18. In view of the above circumstances, according to the present invention, the automatic wire connection is performed at the intermediate position between the wire-breakage position and the start point of the machining block in which the wire breakage occurred only under the conditions that the machining block is of a straight-line command or a circular-arc command having a radius larger than the set value r0 and also the distance between the wire-breakage position and the start point of the machining block in which the wire breakage occurred is equal or larger than the set value D, so that the wire can be inserted into the lower guide as being restricted by the machining fluid flow.

In the automatic wire connection process in Step 18, the brake roller 4 is driven by the brake motor 10 to feed the wire 20 and the wire forwarding pipe mechanism 12 is lowered to the positioning portion 71.

Subsequently, the machining fluid is allowed to flow in the wire forwarding pipe mechanism 12 the guide pipe 25 in the direction of the wire feeding and also the machining fluid is spouted from the nozzle 7a of the upper guide 7. Then, the wire 20 is fed further by the brake roller 4. Since the leading end of the wire 20 has a hemispheric smooth surface because of the fusing and the wire 20 has straightened by the annealing, the wire can be easily inserted through the machining groove as being restricted by the machining fluid flow. Then, the wire 20 is fed by the wire drawing roller 17 and the pinch roller 16 as guided by the machining fluid flow in the guide pipe 25. When it is detected that the wire 20 has passed through the, wire drawing roller 17 and the pinch roller 16 by a non-illustrated detector, the automatic wire connection process terminates.

Upon termination of the automatic wire connection process, the CPU 51 discriminates whether or not an electric discharge retrace mode is set in the data memory 53 (Step S19). If there is set the electric discharge retrace mode, the wire drawing roller 17 is started to rotate and the machining electric power is started to be supplied between the machining electrodes 30a, 30b and the workpiece W, and then the start point of the block indicated by a value by the pointer i is changed to the present position to perform the feed of each axis based on the machining program (Step S21) from the present position. If there is not set the discharge retrace mode, the CPU 51 only performs the feed of each axis (Step S22) to move the table 19 to the machining position stored when the wire breakage is detected, along the path of the machining program (Step S22), whereupon the normal wire electric discharge machining is restarted.

The discharge retrace mode can be selectively set or reset using the keyboard of the operation panel 54 by the operator.

If the radius r of the circular-arc command is smaller than the set value r0 in Step S10 and if the length D between the wire breakage position and the start point of the block in which the wire breakage occurred is smaller than the set value D0, the automatic connection is not performed in the machining groove of the block in which the wire breakage occurred and the processing proceeds to Step 11, because the machining fluid flow from the nozzle of the upper guide is disturbed to make it difficult to guide the wire 20 to the lower guide in automatically connecting the wire 20 at the intermediate position between the wire-breakage position and the start point of the machining block in which the wire breakage occurred, as described above. In Step S11 it is discriminated whether or not a block immediately preceding the block (indicated by the pointer i) in which the wire breakage occurred is of a circular arc command. If it is discriminated to be of a circular-arc command, it is further discriminated whether or not the radius r of the circular arc command is equal to or larger than the set value r0 (Step S23). If the preceding block is of a straight-line command or a circular-arc command having a radius r equal to or larger than the set value r0, the CPU 51 reads a block which is two block preceding the block in which the wire breakage occurred (i.e. the block corresponding to a value smaller by two than the value of the pointer i), to read the end point Pe2 of the two block preceding block. Thus, the start point Pe2 of the one block preceding block is read (Step S12). Then, the length D between the start and end points Pe2 and Pe1 of the one block preceding block (Step. S13) is obtained and the obtained length D is compared with the set value D0 (step S14). If the length D is equal to or larger than the set value D0, an intermediate position between the start and end points Pe2 and Pe1 of the one block preceding block ids obtained, the table is positioned at the intermediate position, and the pointer i is decreased by "1" so as to indicate the one block preceding block (Steps S15, S16, S17).

Then, the automatic wire connection is performed as described above, the wire is moved to the wire breakage position by the electric discharge retrace or a dry retrace based on the machining program by changing thee starting point of the block indicated by the pointer i to the present position, and then the electric discharging machining is restarted at the wire breakage position.

In the case where the one block preceding block is discriminated to be of a circular arc command having a radius r smaller than the set value r0 in Step S23 to make it difficult to perform the automatic wire connection in the machining groove in the circular arc for the above-mentioned reason, and in the case where the length D between the start and end points Pe2 and Pe1 of the one block preceding block is smaller than the set value D0 in Step 14 and it is discriminated to be difficult to guide the wire to the lower guide as the machining fluid flow from the upper nozzle is disturbed, the processing proceeds to Step S24. In Step S24, in this embodiment, the table is moved to be positioned at a machining start hole and after the pointer i for indicating a machining block in execution to the value for a machining start block (Steps S24, S25), the processing proceeds to Step S18 in which the automatic wire connection is performed at the machining start hole. Then, there tracing is started from the block indicated by the pointer value, i.e. the machining start block, and upon arrival at the wire breakage position the electric discharge machining is restarted (Steps S18–S22).

According to the above embodiment, in the case where it is difficult to automatically connect the wire through the machined groove of the block in which the wire breakage occurred, the wire is automatically connected through the groove machined bathe one block preceding block. Further, in the case where it is difficult to automatically connect the wire through the groove machined by the one block preceding block, the table is moved back to the machining start hole and the wire is automatically connected there. Alternatively, a block in which the automatic wire connection can be stably performed at the intermediate position between the start and end points thereof may be found out over successive blocks backwardly one by one from the block in which the wire breakage occurred.

In this case, the processing of the Steps S11–S14 and S23 are repeatedly executed. Specifically, the pointer i is decreased by "1" before the processing of Step S11 and in Step S11, it is discriminated whether or not the block indicated by the pointer i is of a circular arc command. In Step S12, an end point of a block which is one block preceding the block indicated by the pointer i is read. The length D between the start and end points of the block indicated by the pointer i and the length D is compared with the set value D0. If the discrimination of Step S23 is "NO" or if the discrimination in Step S14 is "YES", the pointer i is decreased by "1", to return to Step S11 and a block having a length D between the start and end points is larger than the set value D0 is found in Step S14. The processing proceeds to Step S24 only when the length D between the start and end points of every block is smaller than the set value D0. In this case, since the pointer i is already updated, it is unnecessary to set the pointer i in Step S17, S25.

According to the present invention, a time period necessary for the retracing operation to the wire breakage position is shortened after completing the automatic wire connection and the electric discharge machining can be restarted in a short time.

We claim:

1. A method of automatically recovering a wire breakage in a wire electric discharge machine having upper and lower guides disposed on a wire path, an annealing and fusing device for annealing and fusing the wire by an electric current flow in the wire from a pair of wire-fusing electrodes disposed upstream of the upper guide, and a nozzle for spouting a machining fluid to restrict a direction of the wire being fed from the upper guide, said method comprising the steps of:

(a) annealing a portion of the wire upstream of a position of the wire breakage and fusing an end of the annealed wire portion by said annealing and fusing device, and removing the portion of the wire exhausted by electric discharge machining and separated by the fusing, when the wire is broken during electric discharging machining;

(b) discriminating whether a machining block in which the wire breakage has occurred is of a straight-line command or of a circular-arc command;

(c) discriminating whether or not said machining block is of a circular-arc command having a radius equal to or larger than a set radius, if it is discriminated that said machining block is of a circular-arc command in said step (b);

(d) discriminating whether or not a length of movement of the wire on a machining path between a start point of the machining block and the wire breakage position is equal or larger than a set value, if it is discriminated that the machining block is of a straight-line command in said step (b) or of a circular-arc command having a radius equal or larger than the set radius in said step (c);

(e) automatically connecting the wire at an intermediate position on the machining path between the start point of said machining block and the wire breakage position while spouting the machining fluid from said nozzle to restrict the wire, if it is discriminated that the length of movement of the wire on the machining path between the start point of said machining block and the wire breakage position is equal to or larger than the set value in said step (d);

(f) discriminating whether a machining block immediately preceding said machining block is of a straight-line command or of a circular-arc command, if it is discriminated that said machining block in which the wire breakage occurred is of a circular-arc command having a radius smaller than the set value in said step (c) or if it is discriminated that the length of movement of the wire on the machining path between the start point of the machining block and the wire breakage position is smaller than the set value in said step (d);

(g) discriminating whether, or not said immediately preceding machining block is of a circular-arc command having a radius larger than the set radius if it is discriminated that said immediately preceding machining block is of a circular-arc command in said step (f);

(h) discriminating whether or not a length of movement of the wire on a machining path between start and end points of said immediately preceding machining block is equal to or larger than the set value, if it is discriminated that said immediately preceding machining block is of a straight-line command in said step (f) or if it is discriminated that the immediately preceding machining block is of a circular-arc command having a radius larger than the set radius in said step (g);

(i) automatically connecting the wire at an intermediate position on the machining path between the start and end points of said immediately preceding machining block while spouting the machining fluid from said nozzle to restrict the wire, if it is discriminated that the length of movement of the wire on the machining path between the start and end points of said immediately preceding machining block is equal to or larger than the set value in said step (h); and (j) automatically connecting the wire at a position of a machining start hole, if it is discriminated that said immediately preceding machining block is of a circular-arc command having a radius smaller than the set radius in said (g) or if it is discriminated that the length of movement of the wire on the machining path between the start and end points of said immediately preceding machining block is smaller than the set value.

2. A method of automatically recovering a wire breakage according to claim 1, wherein said intermediate position of the machining block is set to be a central position on the machining path between the start point of the machining block and the wire breakage position in said step (e), and said intermediate position of the immediately preceding machining block is set to be a central position on the machining path between the start and end points of said immediately preceding machining block in said step (i).

3. A method of automatically recovering a wire breakage in a wire electric discharge machine having upper and lower guides disposed on a wire path, an annealing and fusing device for annealing and fusing the wire by an electric current flow in the wire from a pair of wire-fusing electrodes disposed upstream of the upper guide, and a nozzle for spouting a machining fluid to restrict a direction of the wire being fed from the upper guide, said method comprising the steps of:

(a) annealing a portion of the wire upstream of a position of the wire breakage and fusing an end of the annealed wire portion by said annealing and fusing device, and removing the portion of the wire exhausted by electric discharge machining and separated by the fusing, when the wire is broken during electric discharging machining;

(b) discriminating whether a machining block in which the wire breakage has occurred is of a straight-line command or of a circular-arc command;

(c) discriminating whether or not said machining block is of a circular-arc command having a radius equal to or larger than a set radius, if it is discriminated that said machining block is of a circular-arc command in said step (b);

(d) discriminating whether or not a length of movement of the wire on a machining path between a start point of said machining block and the wire breakage position is equator larger than a set value, if it is discriminated that the machining block is of a straight-line command in said step (b) or of a circular-arc command having a radius equal or larger than the set radius in said step (c);

(e) automatically connecting the wire at an intermediate position on the machining path between the start point of said machining block and the wire breakage position while spouting the machining fluid from said nozzle to restrict the wire, if it is discriminated that the length of movement of the wire on the machining path between the start point of said machining block and the wire breakage position is equal to or larger than the set value in said step (d);

(f) tracing back a machining program to find a machining block of a straight-line command or of a circular-arc command having a radius larger than the set radius and in which the distance between the start and end points of the machining block is larger than the set value, if it is discriminated that said machining block in which the wire breakage occurred is of a circular-arc command having a radius smaller than the set value in said step (c) or if it is discriminated that the length of movement of the wire on the machining path between the start point of the machining block and the wire breakage position is smaller than the set value in said step (d);

(g) automatically connecting the wire at an intermediate position on the machining path between the start and end points of said machining block found in said step (f) while spouting the machining fluid from said nozzle to restrict the wire; and (h) automatically connecting the wire at a position of a machining start hole if there is not found any machining block of a straight-line command or of a circular-arc command having a radius larger than the set radius and in which the distance between the start and end points of the machining block is equal to or larger than the set value.

4. A method of automatically recovering a wire breakage according to claim 3, wherein said intermediate position of the machining block is set to be a central position on the machining path between the start point of the machining block and the wire breakage position in said step (e), and said intermediate position of the found machining block is set to be a central position on the machining path between the start and end points of said machining block in said step (g).

* * * * *

UNITED STATES PATENT AND TRADEMARK OFFICE
CERTIFICATE OF CORRECTION

PATENT NO. : 5,753,880

DATED : May 19, 1998

INVENTOR(S) : Kajitori et al.

It is certified that error appears in the above-identified patent and that said Letters Patent is hereby corrected as shown below:

Title Page [75], "Oshino-mura" should be --Yamanashi--.

Col. 1, line 17, "guides" should be --guides,--;
line 23, NO NEW PARAGRAPH.

Col. 4, line 18, "wire" should be --wire 20--;
line 59, "15 retracting a" should be --moved away from--.

Col. 5, line 41, "roller" should be --roller 17--;
line 50, "NC," should be --NC--;
line 53, in," should be --in--.

Col. 8, line 44, "the, wire" should be --the wire--.

Col. 9, line 31, "id" should be --is--;

line 38, "thee" should be --the--;

line 67, "bathe" should be --by the--.

Signed and Sealed this

First Day of September, 1998

Attest:

BRUCE LEHMAN

*Attesting Officer*     *Commissioner of Patents and Trademarks*